Sept. 5, 1961 J. P. ST. AMOUR 2,998,656
HOLE LOCATION GAUGE
Filed Feb. 27, 1958
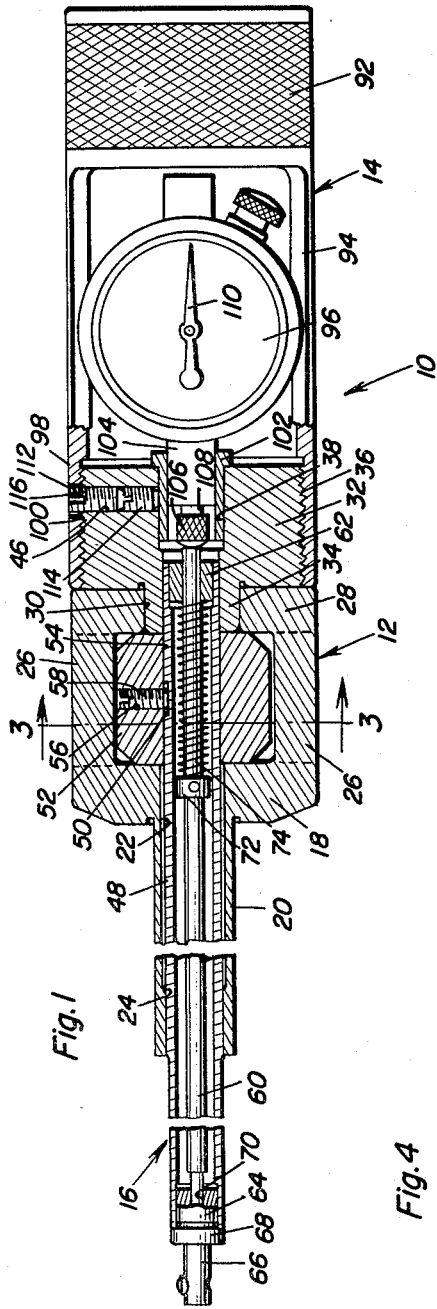
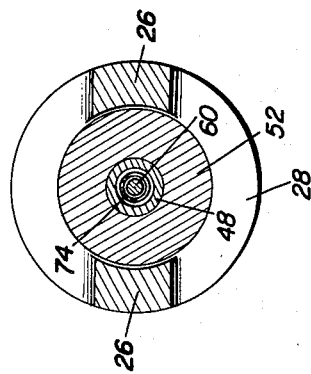
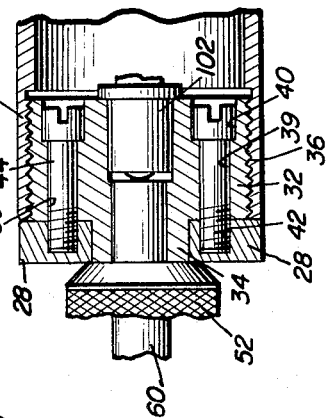
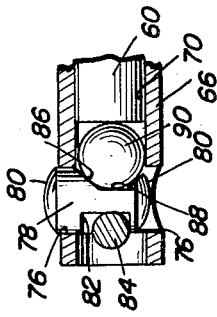
John P. St. Amour
INVENTOR.
BY Clarence A. O'Brien
and Harvey B. Jacobson
Attorneys

United States Patent Office 2,998,656
Patented Sept. 5, 1961

2,998,656
HOLE LOCATION GAUGE
John P. St. Amour, 26514 W. Seven Mile Road, Detroit, Mich.
Filed Feb. 27, 1958, Ser. No. 717,888
6 Claims. (Cl. 33—178)

This invention relates generally to gauges to be used for machine tool work, and more particularly to a dial indicator gauge for determining location and concentricity of holes or bores.

The primary object of this invention is to provide a hole location gauge which permits the checking of the hole location and concentricity without the necessity for the operator's turning his hand or the gauge handle, yet permits a direct reading on the indicator.

Another object of this invention is to provide a device of the character described wherein the wear on the pilot will be reduced to a minimum, because the pilot, which is an elongated extension of the body, is stationary and does not rotate.

A further object of this invention is to provide a device of the character described wherein the indicator is completely guarded and protected so that damage and marring will be eliminated.

An even further object of this invention is to provide a device which will give extremely accurate measurements of hole concentricity, and yet still be readily readable on the indicator provided, so that an operator, by using a single hand and by merely glancing at the indicator, may determine the concentricity of any hole or bore.

Yet a further object of this invention is to provide a simple and inexpensive device and yet one which is exceedingly effective for the purpose for which it is designed.

This invention contemplates the use of a body portion having a chamber therein, with a pilot or elongated extension projecting from the body and having a bore therein communicating with the chamber. A sleeve is located within the pilot and is rotatable therein. The sleeve projects downwardly from the pilot, and in the lower end thereof is located a housing which accommodates a bore feeler and also the lower end of a shaft which is slidable therein. The upper end of this shaft abuts against the movable plunger of a dial indicator, so that any vertical movement of this shaft will be detected by the indicator. A knurled knob is provided within the chamber in the body and is fixed to the sleeve, so that rotation of the knob will also rotate the sleeve, and the feeler, so that 360° of concentricity may be determined. While the sleeve, feeler and knob are rotatable, the rest of the gauge is not, and the indicator remains stationary, so that it is always facing the operator even while the sleeve is being rotated. A handle is provided and attached to the casing, and serves to protect the indicator as well as providing a hand-grip for an operator.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical sectional view taken centrally through the device, illustrating details of construction thereof;

FIGURE 2 is a partial vertical sectional view illustrating the details of connecting the adapter to the body;

FIGURE 3 is a horizontal sectional view taken substantially along the plane defined by reference line 3—3 of FIGURE 1; and FIGURE 4 is an enlarged vertical sectional view of the feeler, illustrating the details of construction thereof.

Referring now more specifically to the drawings, the numeral 10 generally designates the gauge comprising the present invention, which is constructed of a body portion 12, a handle 14, and a gauge mechanism 16.

The body portion 12, is constructed of a circular bottom 18, having a pilot or elongated section 20, depending downwardly therefrom that is adapted to be closely fitted in a hole in a master gauge (not shown) for the purpose of locating a hole in a workpiece (not shown). A bore 22 is formed vertically therethrough, and becomes smaller near the lower end thereof as indicated at 24. Upstanding walls 26 are connected at diametrically opposed sides of the bottom 18, and connect bottom 18 to an upper circular member 28, which has a vertical central opening 30 formed therethrough.

A circular adapter 32 having a depending neck 34 which projects into opening 30 of body 12, is threaded on its outer circular surface as at 36. A central bore 38 is formed vertically through adapter 32, and is in alignment with bore 22. Vertical bores 39 are formed vertically through adapter 32, and counterbores 40 are formed in the upper portion thereof and in the upper surface of the adapter. Blind, threaded bores 42 are formed in the upper edge of upper member 28 of body 12, and are in substantial alignment with bores 39 in the adapter. Bolts 44 are passed through bores 39, and have the heads thereof seated within counterbores 40, and the lower threaded ends thereof, threaded into threaded openings 42 in upper member 28, thus locking the adapter 32 to the gauge body 12. A horizontal threaded bore 46 is formed through the upper end of adapter 32 and communicates with central vertical bore 38 for a purpose which will be explained below.

The gauge mechanism 16 is formed generally within and about a vertical sleeve 48 which is disposed within pilot 20, and journalled in bore 24, as well as in adapter 32. The sleeve 48 has a vertical slot 50 formed in one side thereof. A knurled knob 52 having a vertical bore 54 formed therethrough, is disposed within body 12, and between the upstanding walls 26. A horizontal threaded bore 56 is formed in knob 52, and communicates with vertical bore 54. A setscrew 58 is threaded therein, and engaged within slot 50, so that sleeve 48 may have a limited upward and downward movement, the limits of its movement being controlled by the ends of slot 50 engaging the inner end of setscrew 58. Of course, it will be realized that when setscrew 58 is tightened, then no vertical movement of the sleeve 48 may take place. Also, when knob 52 is rotated, and the setscrew 58 is tightened onto the sleeve 48, the sleeve 48 will also be rotated, it being journalled within the lower end of adapter 32, and the lower end of pilot 20. A rod 60 located within the sleeve 48, is vertically slidable therein. The upper end of the rod 60 being slidably journalled within bearing 62 which is located and securely held in place within the upper open end of the sleeve 48, and the lower end is slidably journalled within a nose 64 which is secured in and closes the lower end of the sleeve 48, and has a projecting hollow tubular portion 66 extending outwardly therefrom. A collar 68 mounted on tubular portion 66 engages the outer lower edge of the sleeve 48, and serves to restrict inward movement of the nose 64. The nose 64 has a vertical bore 70 extending therethrough to accommodate rod 60 and allow it to be moved vertically.

A collar 72 is fixed to shaft 60 near the upper end thereof, and a spring 74 is disposed about the rod or shaft and located between collar 72 and the lower end of bearing 62, so that rod 60 is constantly being urged to its lower limited position, and any time the rod is moved upwardly, it will be biased downwardly to its lowermost position.

A pair of horizontally aligned openings 76 are formed in the lower end of projecting tubular portion 66 of nose 64, and a horizontally disposed cylindrical feeler 78 is located therein for sliding movement within the openings 76. The feeler has rounded ends 80 which are adapted to contact the walls of any bores or any holes of which the gauge is to determine the location or concentricity. A slot 82 is formed in the lower surface of feeler 78, and a pin 84 which is firmly connected to extended portion 66, is disposed within slot 82 and serves to lock the feeler 78 within the nose 64. A notched out portion 88 is formed in the upper portion of the feeler 78, and this includes an inclined cam surface 86. A ball 90 is disposed within the notch 88, so that upon movement of the feeler 78 inwardly, the cam surface 86 will cause the ball 90 to rise therein, thus raising the rod 60 within the gauge.

The upper handle 14 consists of a solid cylindrical portion 92 which is knurled, and an intermediate hollowed out portion 94, which is to house the dial indicator 96. The lower end 98 of the handle is hollow and has threads 100 formed on the inner surface thereof, which are adapted to engage the threads 36 on the outer end of adapter 32, so that the adapter will be locked to the handle and a unitary device is formed, since the adapter 32 is in turn locked to body portion 12. A sleeve 102 is inserted within bore 38 of adapter 32, and this accepts a projecting hollow cylindrical portion 104 of dial indicator 96. A shaft 108 is disposed within the cylindrical portion 104 and is slidably mounted therein and is connected with the mechanism of dial indicator 96, so that upon vertical movement of shaft 108, the pointer 110 of the indicator will be moved. A knob 106 which is knurled and has a lower rounded surface is connected to the lower end of shaft 108, and the upper end of rod 60 is connected thereto, so that upon vertical movement of rod 60, the pointer 110 of dial indicator 96 will be moved. An opening 112 is formed in hollow handle 98 and is in alignment with horizontal bore 46 in adapter 32, and accommodates a first setscrew 114 which serves to lock the sleeve 102 to the adapter 32, and a second setscrew 116 is fastened securely to the first setscrew, and projects outwardly of adapter 32 yet is disposed within opening 112, so that no relative movement between the handle 14 and adapter 32 may take place.

It is thought that the use of this device will be readily apparent. Hole location gauges are usually considered as part of a master gauge and provide a means of determining the location of holes in the part being inspected in relation to the known location of the holes in the master gauge. The part to be checked will be clamped in the master or reference gauge. Then, the pilot body 20 would be inserted in a closely fitted hole in the master gauge. The sleeve 48 would then be rotated by means of rotating knob 52, with the thumb and forefinger. The feeler 78 may then contact the wall of a bore or hole being checked, and because of the cam surface 86 and the ball 90, the feeler 78 will cause the pointer 110 to register any out of roundness of the hole as well as the position of the hole being checked in relation to the master gauge hole. Thus, since the location and also the diameter of the hole being checked will be registered by the pointer 110, an operator using this device may interpret this reading so as to determine the correct location and concentricity of a hole.

It may now be seen that there has been shown and described in this application a new and improved type of hole location or concentricity gauge which is extremely suitable for the purpose for which it is designed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hole location and concentricity gauge comprising a body having a chamber located therein, an elongated section of said body having a longitudinal bore therein communicating with said chamber, a vertical shaft slidably disposed in the bore of said section and the chamber in said body, a sleeve encircling said shaft, means connected to the end of said sleeve and movable transversely thereof for detecting the concentricity of a hole and transmitting longitudinal movement to said shaft upon movement of said detecting means transversely of said sleeve, a handle fastened to said body, an indicator attached to said handle and contacting the upper end of said shaft for indicating the amount of longitudinal movement of said shaft and therefore movement of said detecting means transversely of said sleeve, and means in said chamber for rotating said sleeve independently of said body.

2. A hole location and concentricity gauge comprising a body having a chamber located therein, an elongated section of said body having a bore therein communicating with said chamber, a vertical shaft slidably disposed in the bore of said section and the chamber in said body, a sleeve encircling said shaft, means connected to the end of said sleeve for detecting the concentricity of a hole and transmitting motion to said shaft, a handle fastened to said body, an indicator attached to said handle and contacting the upper end of said shaft for indicating the amount of movement of said detecting means, means in said chamber for rotating said sleeve independently of said shaft, said detecting means including a projecting tube connected to said sleeve, a feeler horizontally slidable in said tube, a cam surface on said feeler, and a ball disposed internally of said tube and in contact with said cam surface and the lower end of said shaft.

3. A hole location and concentricity gauge comprising a body having an elongated longitudinal bore extending therethrough, a sleeve rotatably supported from said body and concentric with said bore, a shaft slidably disposed in said sleeve, means carried by one end of said sleeve and mounted for movement transversely of the sleeve for detecting the concentricity of a hole and connected to the corresponding end of said shaft for effecting longitudinal movement of the shaft responsive to movement of said detecting means transversely of said sleeve, an indicator carried by said body and connected to the end of said shaft remote from said detecting means for registering movement of said shaft, and means connected to said sleeve and carried by said body for effecting rotation of said sleeve independently of said body.

4. A hole location and concentricity gauge comprising a body having an elongated longitudinal bore extending therethrough, a sleeve rotatably disposed in said bore and having one end portion projecting from one end thereof, a shaft slidably disposed in said sleeve, means carried by one end of said sleeve and mounted for movement transversely of the sleeve for detecting the concentricity of a hole and connected to the corresponding end of said shaft for effecting longitudinal movement of the shaft responsive to movement of said detecting means transversely of said sleeve, an indicator carried by said body and connected to the end of said shaft remote from said detecting means for registering movement of said shaft, and means connected to the sleeve and carried by said body for effecting rotation of said sleeve independently of said body, an elongated cylindrical pilot section carried by said body surrounding a portion of said projecting portion of said sleeve.

5. A hole location and concentricity gauge comprising a body having an elongated longitudinal bore extending therethrough, a sleeve rotatably disposed in said bore and having one end portion projecting from one end thereof, a shaft slidably disposed in said sleeve, means carried by one end of said sleeve and mounted for movement transversely of the sleeve for detecting the concentricity of a hole and connected to the corresponding end of said shaft for effecting longitudinal movement of the shaft responsive to movement of said detecting means transversely of said sleeve, an indicator carried by said body and connected to the end of said shaft remote from said detecting means for registering movement of said shaft, and means connected to the sleeve and carried by said body for effecting rotation of said sleeve independently of said body, said one end of said sleeve having aligned transversely extending openings formed therein, said detecting means comprising a feeler slidably disposed in said openings and projecting from one of the openings, a cam surface on said feeler, a ball disposed internally of said sleeve and in contact with said cam surface and said corresponding end of said shaft.

6. A hole location and concentricity gauge comprising a body having an elongated longitudinally bore extending therethrough, a sleeve rotatably disposed in said bore and having one end portion projecting from one end thereof, a shaft slidably disposed in said sleeve, means carried by one end of said sleeve and mounted for movement transversely of the sleeve for detecting the concentricity of a hole and connected to the corresponding end of said shaft for effecting longitudinal movement of the shaft responsive to movement of said detecting means transversely of said sleeve, an indicator carried by said body and connected to the end of said shaft remote from said detecting means for registering movement of said shaft, and means connected to the sleeve and carried by said body for effecting rotation of said sleeve independently of said body, an elongated cylindrical pilot section carried by said body surrounding a portion of said projecting portion of said sleeve, said one end of said sleeve having aligned transversely extending openings formed therein, said detecting means comprising, a feeler slidably disposed in said openings and projecting from one of the openings, a cam surface on said feeler, a ball disposed internally of said sleeve and in contact with said cam surface and said corresponding end of said shaft.

References Cited in the file of this patent
UNITED STATES PATENTS

| | | |
|---|---|---|
| 2,400,293 | Dunn | May 14, 1946 |
| 2,766,532 | Eisele | Oct. 16, 1956 |

OTHER REFERENCES

Roulet, publication in American Machinist, page 183, Feb. 13, 1953. 33-178A (copy in Library).